March 23, 1926.

E. CLARK ET AL

PAVING OR FLOORING

Filed August 7, 1924

1,577,610

INVENTORS

ATTORNEYS

Patented Mar. 23, 1926.

1,577,610

UNITED STATES PATENT OFFICE.

ERNEST CLARK, OF NEW YORK, N. Y., AND DANIEL T. GILMARTIN, JR., OF EAST ORANGE, NEW JERSEY.

PAVING OR FLOORING.

Application filed August 7, 1924. Serial No. 730,635.

*To all whom it may concern:*

Be it known that we, ERNEST CLARK, a citizen of the Commonwealth of Australia, and DANIEL T. GILMARTIN, Jr., a citizen of the United States, and residents of the borough of Manhattan, in the city, county, and State of New York, and East Orange, in the county of Essex and State of New Jersey, respectively, have invented a new and useful Improved Paving or Flooring, of which the following is a specification.

This invention relates to an improved paving or flooring, and has for an object to provide an improved structure of this character which includes, among other features of value, the qualities of resilience, silence and durability.

Another object consists in providing certain improvements in the form, construction, material, composition and arrangement of the several parts, whereby the above named and other objects may be effectively attained.

Broadly considered, the invention comprehends the provision of a plastic bed of considerable area and composed of such material as, for instance, concrete; the provision of a rubber paving or flooring element having projections thereon composed of material of substantially the same nature as the paving element proper formed and arranged in a particular manner; and the direct application of the said paving elements to the plastic bed so as to force into the latter the projections on the elements and, by virtue of such contact, establish a paving or flooring having the desirable qualities above named.

When, in this patent, we use the word "rubber", we intend to include any practical compound of rubber and, more particularly, a vulcanized rubber compound. When we refer to "plastic" material, we intend to include any plastic substance suitable for the purpose, and more particularly, a cementitious substance, such as concrete.

The direct application of the rubber element to the plastic element is of importance, since it promotes simplicity and economy and because a rubber element and a cementitious substance are very readily brought together into a firm union when projections are provided on the rubber to be encompassed by the cement. This not only produces a highly desirable result, but the elimination of extraneous fastening elements, such as metallic devices, is of pronounced importance.

Figure 1:
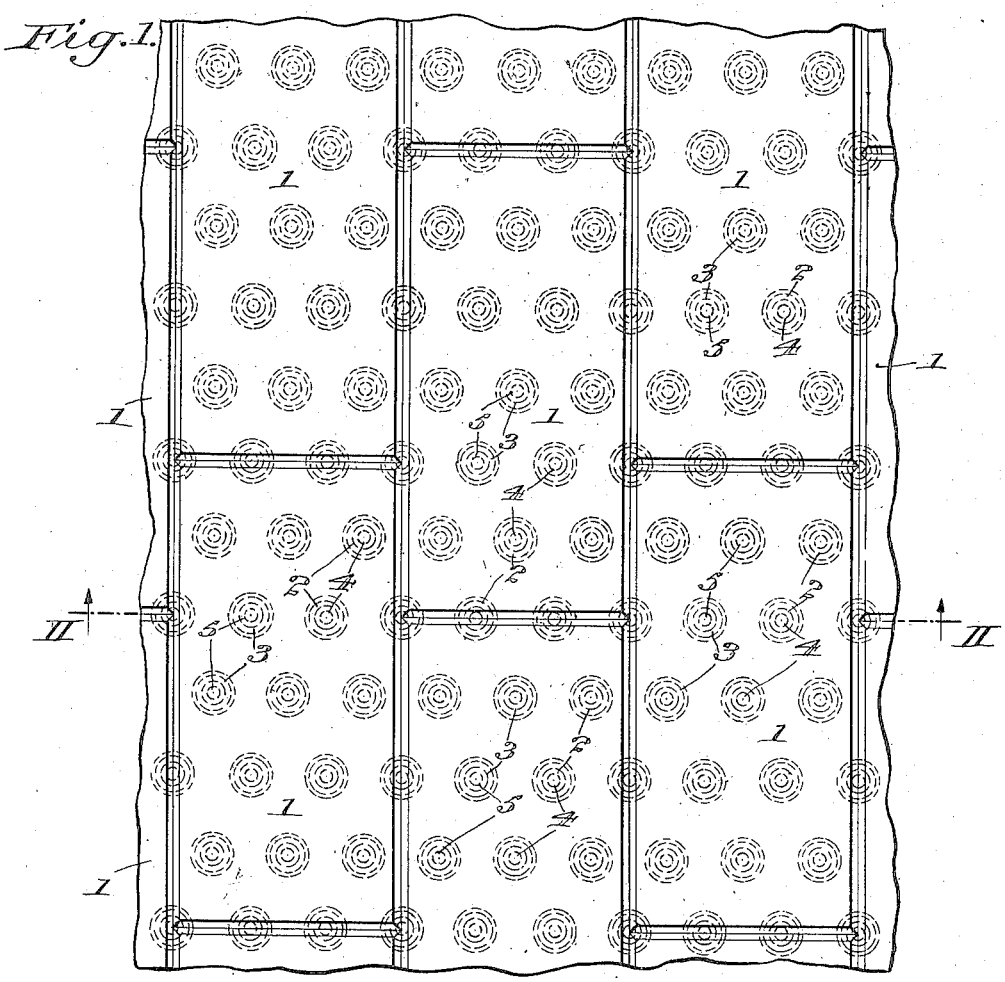
Figure 2:
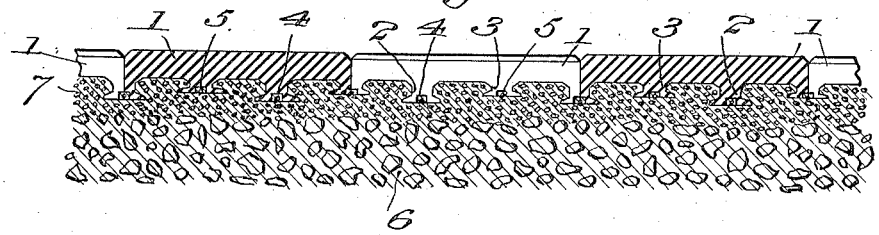

A practical embodiment of our invention is represented in the accompanying drawings, in which Fig. 1 represents a top plan view of an area of such paving, and Fig. 2 represents a section taken in the plane of the line II—II of Fig. 1, looking in the direction of the arrows.

The rubber elements are all the same and it will, therefore, suffice to describe one.

The element is denoted in general by 1, and it has a series of studs 2, 3, projecting from the lower surface thereof. It will be observed that the studs of the series 2 are somewhat higher than those of the series 3. This is a feature of some value because it insures that the studs shall be arranged in a staggered relationship, when considered in their relative horizontal location, when they are embedded in the plastic substance, and thereby prevent the formation of a line or plane of weakness in the plastic bed, which might be occasioned if the height of all the studs were the same, and which line or plane of weakness might have a tendency to promote cleavage under service conditions.

The heads or outer surfaces of the studs are enlarged, or, to express it in another way, the studs are undercut toward the under face of the element as clearly shown in Fig. 2, in order to insure a stronger union or interlocking between the rubber element and the plastic bed. The said heads also have depressions 4, 5 which increase the interlocking effect but are more particularly designed to assist in the withdrawal of the rubber element 1 from the metallic mold in which it will be vulcanized. The presence of these depressions 4, 5 permits the laterally projecting or enlarged heads of the studs to readily be compressed or reduced in diameter by the manual act of pulling the rubber element out of its metallic mold.

If desired, the said studs may be composed of a harder rubber compound than the rubber element proper.

The plastic bed may preferably be composed of two layers of cementitious material, such as concrete; the lower layer being of comparatively coarse material and denoted in the drawings by 6, while the upper layer is marked 7 and should be composed of sufficiently fine material so that it will readily receive and encompass the projecting studs on the rubber elements.

In practice, we propose to lay the first layer of the road bed composed, for instance, of the coarse material 6. The comparatively fine layer 7 will then be spread on the coarse layer and the rubber elements, previously manufactured, compressed downwardly on the layer 7 so that their projecting studs 2, 3 enter the said layer and the bottoms of the rubber elements, intermediate the studs, rest upon the said layer. This pressing operation may satisfactorily be carried out by tamping or an analogous procedure. The natural process of hardening of the layer 7 will cause a very firm gripping of the rubber elements laid thereon as well as union with the sub-layer 6. The road bed is now complete and it will be seen that, in case it becomes necessary to repair the same, it is only requisite to break out some of the rubber elements and part of the layer 7, substitute a new area of the material such as the layer 7, and insert new rubber elements therein.

In certain cases, as in many kinds of flooring, when a reasonably level hard surface is presented, we find it advantageous to dispense with the coarse layer 6 and to lay a fine layer 7 directly upon the surface, which surface may be roughened or provided with recesses so as better to grip the said fine layer. In other cases, as, for instance, in laying the rubber flooring over a wooden floor, we may employ a wire mesh or sheets of expanded metal, or the like, resting upon, and preferably secured to, the wooden surface to receive the fine layer 7 of cementitious material; thus, in this case, also, dispensing with the coarse layer 6.

We wish to emphasize the extreme simplicity of this arrangement and the elimination of fastening devices other than results from the nature and configuration of the rubber elements and the inherent characteristics of the cementitious bed.

Furthermore, the employment of the rubber element laid directly upon a substantial area of plastic material, provides a road bed which is devoid of the disadvantages inherent in one that is characterized by the juxtaposition of a large number of blocks having individual bases or supports. We here refer to the unsatisfactory effects which arise from the action of each individual block and base upon its neighbor under service conditions. This produces what is known as a rumbling or joggling and tends to disintegration of the paving or flooring. Furthermore, where separate blocks with separate bases are employed, there is an opportunity for water to trickle in between the individual blocks and assist in deterioration of the roadway as, for instance, under freezing conditions. Again, defective action of one or more blocks with individual bases will cause the defect to spread and thereby injure adjacent blocks through, perhaps, large areas. This disadvantage is not present when our invention is followed, since the base is unitary over a large area. The fact that we employ paving or flooring elements without individual bases, saves weight, which is important in respect to transportation and also as affecting paving where weight is a prime consideration as, for instance, on bridges. Furthermore, this character of paving or flooring elements lends itself readily to cutting and fitting on the job, which operation is frequently required in connection with manholes, points on surface car lines, curb formations, drains, et cetera.

Great advantages of our invention reside in the fact that the paving or flooring blocks are simple to manufacture, light to transport, simple to lay; and that the unitary base or bed of large area eliminates the inefficient defective or injurious action of blocks with individual bases, above recited, as well as others inherent in such individual base arrangements. The net result is that we obtain a paving or flooring which is very firm and immovable under traffic conditions while having a yielding, silent and durable surface.

While we have shown the projections on the rubber element as in the shape of studs, the invention may be carried out by other forms of projections, and we desire it to be understood that various changes may be resorted to in the form, construction, material, composition and arrangement of the several parts without departing from the spirit and scope of our invention; and hence, we do not intend to be limited to the details herein shown and described, except as they may be included in the claims.

What we claim is:

1. A paving or flooring comprising, a bed of hardened plastic material, and a plurality of rubber surface elements intimately united therewith, each element being provided, on its under face, with a plurality of projections composed of substantially the same material as the element itself, the projections being so formed as to embody within themselves substantial anchoring properties and constituting the sole means of securing the element to the bed, a plurality of said projections being spaced from the edges of the element and so arranged that, on any sectional plane substantially parallel to the paving or flooring surface and passing through a projection, continuous strips of substantial width of bed material extend from each side of each element to the opposite side thereof, and pass between a plurality of said projections spaced from the edges of the element, whereby the elements are secured to the bed material at points sufficient in number and properly located so as to maintain firm union of the elements and the bed irrespective of the direction in which traffic forces may be exerted, and adequate bed area is provided in contact with the under side of the element intermediate the projections.

2. A paving or flooring comprising, a bed of hardened plastic material, and a plurality of rubber surface elements intimately united therewith, each element being provided, on its under face, with a plurality of projections composed of substantially the same material as the element itself, the projections being so formed as to embody within themselves substantial anchoring properties and constituting the sole means of securing the element to the bed, a plurality of said projections being spaced from the edges of the element and so arranged that, on any sectional plane substantially parallel to the paving or flooring surface and passing through a projection, continuous strips of substantial width of bed material extend from each side of each element to the opposite side thereof, and pass between a plurality of said projections spaced from the edges of the element, the total area of the surface of each paving element being at least twice the total area of the bases of its projections, whereby the elements are secured to the bed material at points sufficient in number and properly located so as to maintain firm union of the elements and the bed irrespective of the direction in which traffic forces may be exerted, and adequate bed area is provided in contact with the under side of the element intermediate the projections.

3. A paving or flooring comprising, a bed of hardened plastic material, and a plurality of rubber surface elements intimately united therewith, each element being provided, on its under face, with a plurality of projections composed of substantially the same material as the element itself, the projections being undercut toward the under face of the element, a plurality of said projections being spaced from the edges of the element and so arranged that, on any sectional plane substantially parallel to the paving or flooring surface and passing through a projection, continuous strips of substantial width of bed material extend from each side of each element to the opposite side thereof, and pass between a plurality of said projections spaced from the edges of the element, whereby the elements are secured to the bed material at points sufficient in number and properly located so as to maintain firm union of the elements and the bed irrespective of the direction in which traffic forces may be exerted, and adequate bed area is provided in contact with the under side of the element intermediate the projections.

4. A paving or flooring comprising, a bed of hardened plastic material, and a plurality of rubber surface elements intimately united therewith, each element being provided, on its under face, with a plurality of projections composed of substantially the same material as the element itself, the projections being undercut toward the under face of the element, a plurality of said projections being spaced from the edges of the element and so arranged that, on any sectional plane substantially parallel to the paving or flooring surface and passing through a projection, continuous strips of substantial width of bed material extend from each side of each element to the opposite side thereof, and pass between a plurality of said projections spaced from the edges of the element, the total area of the surface of each paving element being at least twice the total area of the bases of its projections, whereby the elements are secured to the bed material at points sufficient in number and properly located so as to maintain firm union of the elements and the bed irrespective of the direction in which traffic forces may be exerted, and adequate bed area is provided in contact with the under side of the element intermediate the projections.

5. A paving or flooring comprising, a bed of hardened plastic material, and a plurality of rubber surface elements intimately united therewith, each element being provided, on its under face, with a plurality of projections composed of substantially the same material as the element itself, the projections being undercut toward the under face of the element and varying in the distance they extend into the bed, a plurality of said projections being spaced from the edges of the element and so arranged that, on any sectional plane substantially parallel to the paving or flooring surface and passing through a projection, continuous strips of substantial width of bed material extend from each side of each element to the opposite side thereof, and pass between a plurality of said projections spaced from the edges of the element, the total area of the surface of each paving element being at least twice the total area of the bases of its projections, whereby the elements are secured to the bed material at points sufficient in number and properly located so as to maintain firm union of the elements and the bed irrespective of the direction in which traffic forces may be exerted, and adequate bed area is provided in contact with the under side of the element intermediate the projections.

In testimony, that we claim the foregoing as our invention, we have signed our names this first day of August 1924.

ERNEST CLARK.
DANIEL T. GILMARTIN, Jr.